June 21, 1938.  E. G. JOHNSON  2,121,354
VALVE
Filed Dec. 31, 1936   2 Sheets-Sheet 1
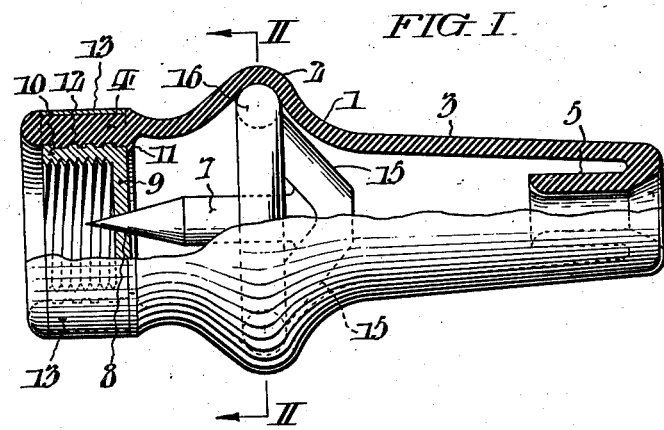
FIG. I.
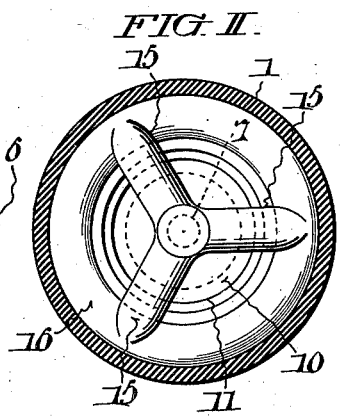
FIG. II.
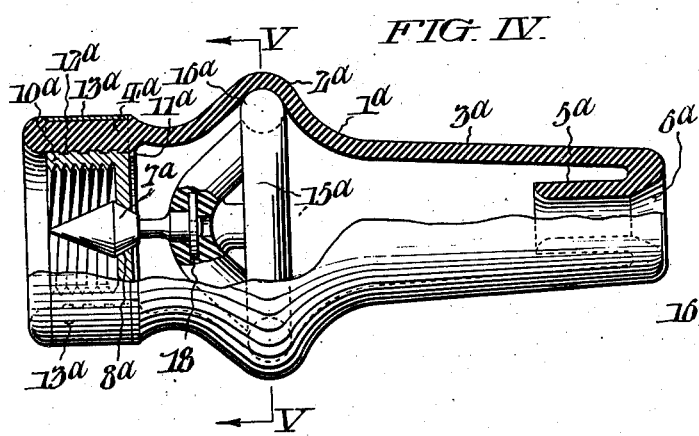
FIG. IV.
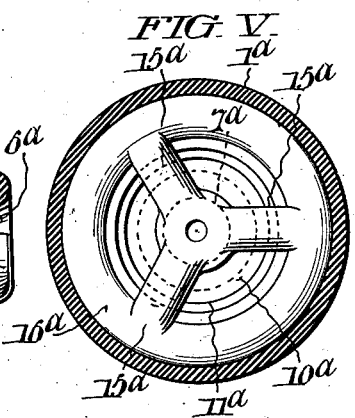
FIG. V.
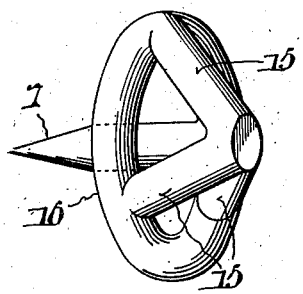
FIG. III.
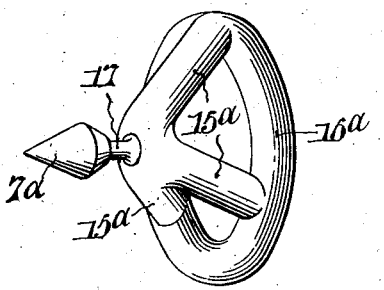
FIG. VI.
WITNESSES:
John C. Bergner
Stanton W. Kerr
INVENTOR:
Eric Goodwin Johnson,
BY
ATTORNEYS.

June 21, 1938.  E. G. JOHNSON  2,121,354
VALVE
Filed Dec. 31, 1936   2 Sheets-Sheet 2
FIG. VII.
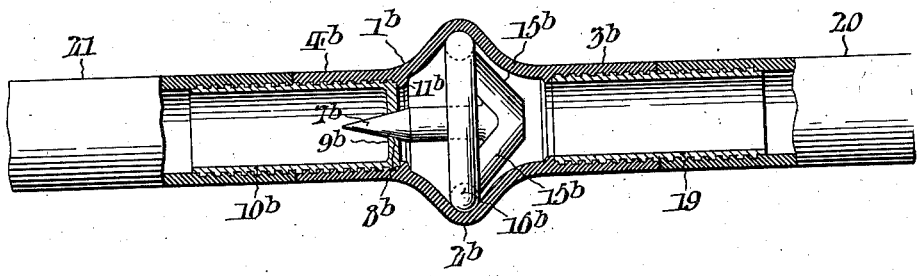
FIG. VIII.
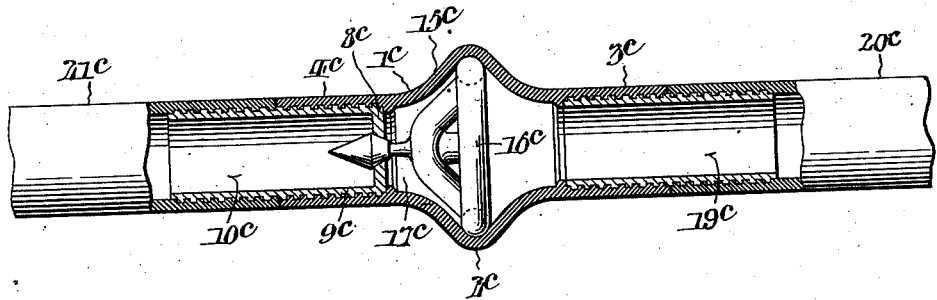
WITNESSES:
John E. Bergner
Stanton W. Kerr
INVENTOR:
Eric Goodwin Johnson,
BY Fraley & Paul
ATTORNEYS.

Patented June 21, 1938

2,121,354

UNITED STATES PATENT OFFICE 2,121,354

VALVE

Eric Goodwin Johnson, Trenton, N. J.

Application December 31, 1936, Serial No. 118,478

16 Claims. (Cl. 299—150)

This invention relates to valves; and it has reference more particularly to valves for controlling discharge from water hoses, fountain syringe tubes, etc.

In the washing of automobiles and similar operations, the manipulation of ordinary metallic nozzles in controlling the discharge of the water is awkward since it entails the use of both hands; and such nozzles are moreover apt to scratch or mar the finish of painted or enameled parts by accidental impact therewith. Again, the pinch clips ordinarily associated with syringe hoses or tubes also have the drawback of requiring the use of both hands to operate them, and in addition, cause rapid wear of the tubes at the pinched regions.

My invention is directed toward overcoming the aforementioned drawbacks, which desideratum I realize in practice, as hereinafter more fully disclosed, through provision of a valve having a compressible body of soft rubber or the like and a flow controlling closure member operable by compression of said body in the palm of the hand holding the valve.

In connection with a valve characterized as above and having a nozzle in prolongation of its body, it is a further aim of my invention to construct the nozzle so that the discharge therefrom can be controlled by pressure of the finger of the hand holding the valve without attendant distortion of the nozzle mouth.

Other objects and advantages of my invention will appear from the following detailed description of the attached drawings, wherein Fig. I is a view partly in elevation and partly in axial section, of a nozzle valve conveniently embodying the present improvements.

Fig. II is a cross section taken as indicated by the arrows II—II in Fig. I.

Fig. III is a perspective view of the closure member of the nozzle valve.

Figs. IV and V are views like Figs. I and II showing an alternative form of my improved valve.

Fig. VI is a perspective view of the closure member of the valve shown in Figs. IV and V.

Fig. VII is a view partly in elevation and partly in axial section of a valve embodying my invention in a form suitable for interposition in a rubber hose or tube; and Fig. VIII shows an alternative form of the valve featured in Fig. VII.

With more detailed reference first to Figs. I and II, the form of valve there illustrated has a compressible hollow tubular body 1 of relatively soft rubber or the like with a circumferential protuberance 2 intermediate a tapering nozzle prolongation 3 at one end and a neck 4 at the other end. At its tip, the nozzle 3 is formed with a tubular axial retroversion 5 which extends inwardly from a flaring mouth 6. Within the body 1 an axial closure member 7 cooperates with a tapered seat around a central orifice 8 in the cross web or diaphragm 9 of an internally-threaded coupling thimble 10 of metal or the like forced into the neck 4. From Fig. I, it will be seen that the inner end of the coupling thimble 10 abuts an annular stop lip 11 internally of the body 1, and that the same is circumferentially grooved as at 12 so as to be held against axial shifting within the neck 4. Preferably a clamp band 13 is placed about the neck 4 to more effectively secure the thimble 10.

The closure member 7, it will be noted, is centrally supported by convergingly arranged radial spider arms 15 of a ring 16 which fits snugly within the protuberance 2 of the valve body 1, said closure member, arms and ring being all integrally formed from relatively soft rubber like the body 1, see Fig. III.

In use, the nozzle valve is held in one hand and operated by pressure of the palm upon the protuberance 2, the ring 16 incidentally yielding to distortion with the result that the angle between the spider arms is decreased and the closure member 7 moved rightward in Fig. I in the direction of flow through the valve to open the orifice 8. By pressing the nozzle 3 at the region of the inner end of its retroversion 5 with the fingers of the hand in which the valve is held, it is obviously possible to regulate the discharge from the nozzle without distortion of the nozzle mouth 6.

By virtue of the described construction, it will be seen that the nozzle valve of my invention is particularly advantageous in connection with the washing of automobiles and similar operations due to the fact that it can be controlled with one hand, and further in that the construction of its body from soft rubber will insure against marring of the finish of the automobiles in the event of accidental impact therewith.

In the nozzle valve of Figs. IV and V, the closure member 7a has the configuration of an oppositely tapered head, and opens in a direction opposite to that of the flow through the valve. Preferably the closure member 7a is separately formed from metal with a shank 17 engaged centrally of the converging spider arms 15a of a ring 16a, which, like the ring of the first embodiment is of relatively soft rubber. As shown, the shank 17 is secured at its inner end to a disk 18 embedded in the rubber of the spider and the closure member 7a thereby firmly anchored. In all other respects the construction of the alternative form of nozzle valve of Figs. IV–VI is identical with that of Figs. I and II, and hence, in order to preclude the necessity for repetitive description, all corresponding parts have been identified by the same reference numerals previously employed to which the letter "a" has been added in each instance for the purpose of distinction.

In the valve of Fig. VII which is in a form suitable for use with syringes and the like, the ends 3b, 4b of the valve body 1b are alike, the end 3b being connected by a coupling nipple 19 with one section 20 of a tube or hose, and the end 4b with another section 21 by a coupling thimble 10b providing the valve orifice 8b. As shown, the closure members 7b of the valve is of the same construction as the closure member 7 of Fig. III, and opens in the direction of fluid flow through the valve.

The valve delineated in Fig. VIII differs from the valve of Fig. VII only in that its closure member 7c is like that of Fig. VI, and opens in a direction opposite to that of fluid flow through the valve.

All the other component elements of Figs. VII and VIII not specifically referred to but having their counterparts in the previously described forms are identified by the same reference numerals respectively distinguished by addition of the letters "b" and "c" respectively, so that here again the necessity for duplicate description is obviated.

It is, of course, to be understood that the various forms of my improved valve herein exemplified for convenience of illustration are not limited to use with rubber hoses alone, since by suitable further modifications within the scope of the appended claims, they can be as readily adapted for use with pipes or tubes of rigid materials like glass or metal.

Having thus described my invention, I claim:

1. A valve having a compressible hollow body, and a flow-controlling closure member therein supported by a series of inclined radial flexible arms so as to be operable by compression of said body.

2. A valve having a compressible hollow body, and a normally-closed flow-controlling closure member therein supported by a series of inclined radial flexible arms so as to be opened by compression of said body.

3. A valve having a compressible hollow body, and a closure member therein supported by a series of inclined radial flexible arms so as to be operable against the flow of fluid through the valve by compression of said body.

4. A valve having a compressible hollow body, and a normally closed closure member therein supported by a series of inclined radial flexible arms so as to be opened in the direction of flow through the valve by compression of said body.

5. A valve having a compressible tubular body, and a normally-closed axially-movable closure member therein supported by a series of inclined radial flexible arms so as to be operable by compression of said body.

6. A valve having a compressible tubular body with an axial flow orifice surrounded by a tapered seat, and an axially-movable closure member supported by a series of inclined radial flexible arms so as to be operable by compression of the body and adapted to close against said seat.

7. A valve having a compressible tubular body with an axial flow orifice surrounded by an inwardly tapering seat, and an axially-movable closure member supported by a series of inclined radial flexible arms so as to be operable by compression of the body and adapted to close against said seat.

8. A valve having a compressible tubular body, a valve seat within said body, and an axially-movable closure member therein cooperative with the seat operable by compression of the body, said closure member being centrally supported by inclined radial spider arms of a resilient ring fitting within said body.

9. A valve having a compressible tubular body with an axial flow orifice at one end thereof surrounded by an inwardly-tapering seat, and an axially-movable closure member operated by compression of the body, said member being formed with an inwardly-extending stem centrally supported by inclined radial spider arms extending from an elastic ring fitting within said body.

10. A valve having a compressible tubular body with a medial circumferential protuberance, a valve seat within the body, and an axially-movable closure member within the body cooperative with the seat and operable by compression of the circumferential protuberance of the body and centrally supported by inclined radial spider arms of a resilient ring lodged within said circumferential protuberance.

11. A valve having a compressible tubular body with a discharge nozzle at one end thereof, and a flow-controlling closure member at the interior supported by a series of inclined radial flexible arms so as to be operable by compression of said body.

12. A hand valve having a compressible tubular body of rubber or the like terminating at one end in a nozzle with tubular axial retroversion extending inward from a flaring mouth, and a closure member supported interiorly of the body, by a series of inclined radial flexible arms, so as to be operable by compression of the body within the palm of said hand, and the discharge from the valve being controllable by compression of the nozzle at the region of its inward retroversion between the fingers.

13. A valve according to claim 6, wherein the closure member is tapered in correspondence with the taper of the seat.

14. A valve according to claim 6, wherein the closure member is tapered to a point at an angle corresponding to that of the seat and passes through the orifice.

15. A valve having a compressible tubular body with an axial flow orifice, and an axially-movable tapered closure member supported by inclined radial flexible arms so as to be operable by compression of the body and adapted to close said orifice.

16. A valve according to claim 15, wherein the closure member tapers to a point and passes through the orifice.

ERIC GOODWIN JOHNSON.